United States Patent
Convery

(10) Patent No.: US 12,186,688 B2
(45) Date of Patent: Jan. 7, 2025

(54) DEWATERING SCREEN

(71) Applicant: CDE Global Limited, Cookstown (GB)

(72) Inventor: Anthony Convery, Moneymore (GB)

(73) Assignee: CDE Global Limited, Cookstown (GB)

( * ) Notice: Subject to any disclaimer, the term of this patent is extended or adjusted under 35 U.S.C. 154(b) by 280 days.

(21) Appl. No.: 17/720,745

(22) Filed: Apr. 14, 2022

(65) Prior Publication Data
US 2022/0331720 A1  Oct. 20, 2022

(30) Foreign Application Priority Data

Apr. 14, 2021 (GB) .................................... 2105292

(51) Int. Cl.
| | |
|---|---|
| B01D 33/03 | (2006.01) |
| B01D 21/26 | (2006.01) |
| B01D 33/74 | (2006.01) |
| B01D 36/04 | (2006.01) |
| B03B 5/34 | (2006.01) |
| B07B 1/46 | (2006.01) |

(52) U.S. Cl.
CPC ....... B01D 33/0353 (2013.01); B01D 21/267 (2013.01); B01D 33/745 (2013.01); B01D 36/045 (2013.01); B07B 1/46 (2013.01); B03B 5/34 (2013.01); B07B 2230/01 (2013.01)

(58) Field of Classification Search
CPC .............. B01D 33/0353; B01D 33/745; B01D 33/722; B01D 33/0346; B01D 21/267; B01D 36/045; B07B 1/46; B03B 5/34; B03B 5/06; B03B 5/04
See application file for complete search history.

(56) References Cited

U.S. PATENT DOCUMENTS 9,409,208 B2   8/2016  Convery et al.

FOREIGN PATENT DOCUMENTS

| CA | 3046045 C | * 12/2019 | ............ B01D 21/01 |
|---|---|---|---|
| CN | 106362945 | 2/2017 | |
| CN | 210080021 | 2/2020 | |
| CN | 211587110 | 9/2020 | |
| GB | 2458977 | 7/2009 | |
| GB | 2524651 | 9/2015 | |
| WO | 2009048783 A2 | 4/2009 | |

OTHER PUBLICATIONS

UK Search Report of corresponding Application No. GB2105292.3, dated Sep. 22, 2021.

* cited by examiner

*Primary Examiner* — Liam Royce
(74) *Attorney, Agent, or Firm* — Gardner, Linn, Burkhart & Ondersma LLP

(57) ABSTRACT

A dewatering screen includes a frame, a deck mounted upon the frame, and the deck having a plurality of apertures therein. The frame is mounted on a base with a vibration generator for imparting vibration to the deck. A delivery device delivers wet particulate material to be dewatered onto the deck, and there is at least one dividing wall extending across a portion of the deck, the dividing wall(s) separating the deck into a material dewatering region and one or more water drainage regions. The delivery device delivers wet particulate material to be dewatered onto the material dewatering region of the deck.

18 Claims, 2 Drawing Sheets

DEWATERING SCREEN

CROSS REFERENCE TO RELATED APPLICATION

The present application claims priority benefit of U.K. Pat. Application Ser. No. 2105292.3, filed Apr. 14, 2021, which is hereby incorporated herein by reference in its entirety.

FIELD OF THE INVENTION

This invention relates to a dewatering screen for separating excess water from particulate material, such as sand.

BACKGROUND OF THE INVENTION

Dewatering screens are used to separate excess water from particulate materials and are used in sand quarrying to remove excess water from sand following grading and/or washing processes.

A typical dewatering screen comprises a frame upon which is mounted a substantially horizontal polyurethane deck having small openings (typically between 0.3 mm and 0.8 mm diameter) for water to pass through. The deck is vibrated at high frequency to shake out excess water (and undersize material and dirt) through the openings and to convey the material across the deck to a downstream end of the screen whereby the substantially dewatered material is discharged over the top of a weir onto a conveyor or into a collection hopper. The frame of the deck is mounted on a base via resilient linkages and the deck is typically vibrated by means of one or more rotatably driven rotors defining eccentric masses, thereby imparting vibratory motion to the deck. The rotors are typically mounted on a structure extending between the side plates of the screen, typically referred to as a motor bridge.

The capacity of a dewatering screen is generally limited by the surface area of the deck. If the flow rate of sand and water onto the deck becomes too great, the water cannot pass through the deck quickly enough and excess water and sand simply washes over the top of the deck and is discharged over the weir. Furthermore, if the flow rate of sand becomes too high, the water is unable to get through the sand to pass through the apertures in the deck and the apertures may become clogged with sand, causing the excess water to pass over the downstream end of the deck with the sand. Therefore, the only way to increase the capacity of known dewatering screens has been to increase the size of the deck, although this leads to increased weight and transportation difficulties. Furthermore, the increased mass of the dewatering screen leads to increased forces when the deck is vibrated, leading to increased wear of the apparatus.

SUMMARY OF THE INVENTION

According to a first aspect of the present invention there is provided a dewatering screen comprising a frame upon which is mounted a deck having a plurality of openings therein, the frame being mounted on a base and being provided with vibration generator for imparting vibration to the deck, delivery means being provided for delivering wet particulate material to be dewatered onto the deck, at least one dividing wall being provided on the deck extending across a portion of the deck, the at least one dividing wall separating the deck into a material dewatering region and one or more water drainage regions, wherein the delivery means is adapted to deliver wet particulate material to be dewatered onto the material dewatering region.

The width of the material dewatering region may be greater than or equal to the total width of the one or more water drainage regions.

Optionally, the at least one dividing wall extends from an upstream end of the deck towards a downstream end of the deck.

Drainage apertures, slots or channels may be provided in at least a portion of the at least one dividing wall providing an alternative route for water to pass from the material dewatering region into the one or more water drainage regions and/or directly into a sump beneath the deck.

Side walls may be provided on either side of the deck, and a rear wall extending between the side walls at the upstream end of the deck, the at least one dividing wall extending from the rear wall of the deck towards the downstream end of the deck. The at least one dividing wall may extend substantially parallel to the side walls. The at least one dividing wall may have a height less than or substantially equal to the height of the side walls. The height of the at least one dividing wall may reduce, continuously and/or in steps, from an upstream end of the at least one dividing wall to its downstream end.

In one embodiment the at least one dividing wall comprises first and second dividing walls respectively located on either side of the material dewatering region, a respective water drainage region being provided between each of the first and second dividing walls and a respective wall of the dewatering screen. The sum of the widths of the water drainage regions may be less than the width of the dewatering region. The width of the dewatering region may be at least twice that of the sum of the widths of the water drainage regions The at least one dividing wall may have a length of between one third and three quarters of the length of the deck.

The openings in the one or more water drainage regions may be greater in area than the openings in the material dewatering region of the deck.

A weir may be provided at the downstream end of the deck over which dewatered oversize material passes, such as to be received in a hopper and/or onto a stockpiling conveyor. The height of the at least one dividing wall may be greater than the height of the weir.

In one embodiment the deck may be arranged substantially horizontally, the vibration generator being adapted to convey particulate material towards a downstream end of the deck.

A sump may be provided beneath the deck for receiving water and undersize material passing through the openings in the deck. Water and undersize material collected in the sump may be pumped to at least one hydrocyclone, at least a portion of the underflow of the at least one hydrocyclone being delivered onto the material dewatering region of the deck.

These and other objects, advantages, purposes and features of the present invention will become apparent upon review of the following specification in conjunction with the drawings.

BRIEF DESCRIPTION OF THE DRAWINGS

A dewatering screen in accordance with an embodiment of the present invention will now be described, by way of example only, with reference to the accompanying drawings, in which.

DETAILED DESCRIPTION OF THE PREFERRED EMBODIMENTS

Figure 1:
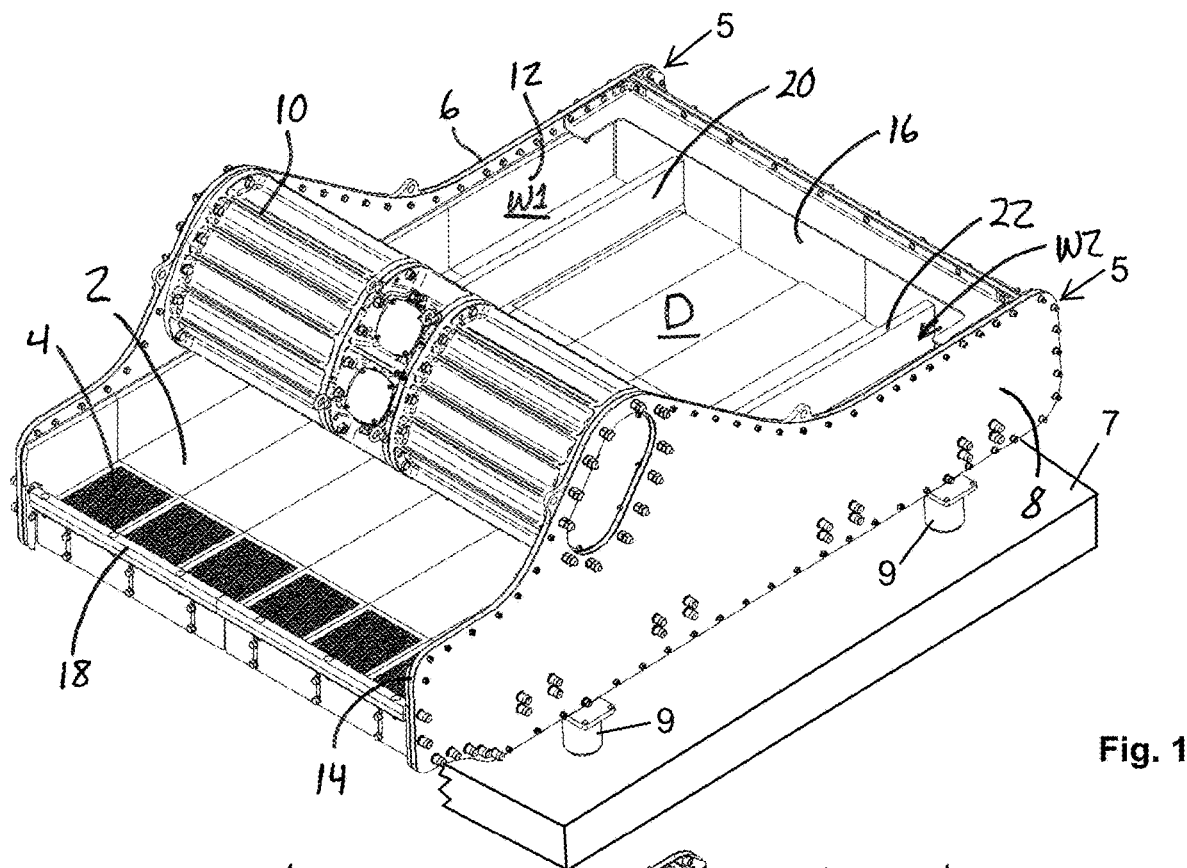
FIG. 1 is a perspective view of a dewatering screen in accordance with an embodiment of the present invention.
Figure 2:
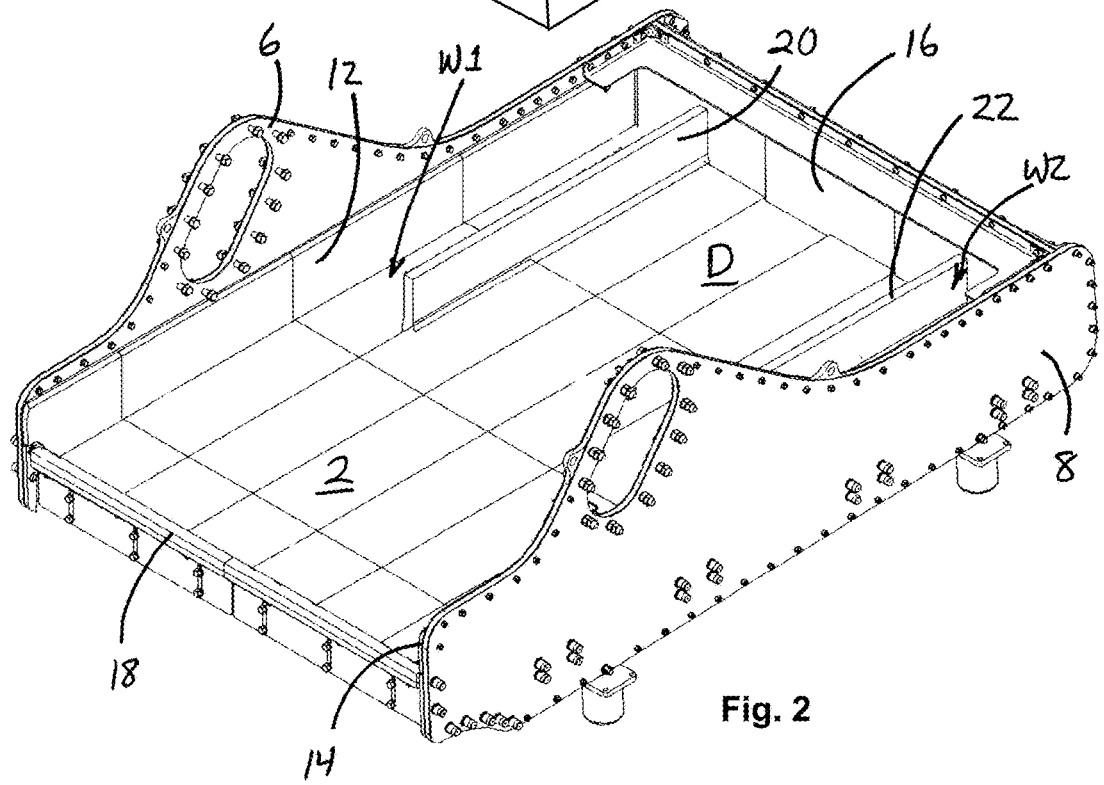
FIG. 2 is a perspective view of the dewatering screen of FIG. 1 with the motor bridge removed for clarity.

A dewatering screen in accordance with an embodiment of the present invention is illustrated in the drawings. The dewatering screen comprises a deck 2 having a plurality of small openings 4 therein through which water and undersize material (for example fine particles and contaminants) can pass.

The deck 2 is mounted on a support frame 5 including spaced apart side plates 6,8 and interconnecting bridging members (extending below the deck and therefore hidden in the drawings). The support frame 5 may be mounted on a base frame 7 via resilient mountings 9 to allow the support frame 5 to move with respect to the base frame 7. The support frame may be suspended from the base frame via suitable resilient mounts.

A vibration generator is mounted between the side plates 6,8 of the support frame, extending transverse to the deck 2 of the dewatering screen. The vibration generator may comprise a pair of eccentrically loaded rotors mounted in a motor bridge 10 extending between the side plates 6,8 for rotation about substantially parallel rotational axes extending transverse to the deck 2. A driver or drive means, such as an electric or hydraulic motor (not shown), is typically provided for rotatably driving the rotors. While the rotors are shown in drawings as being mounted above the deck 2, it is envisaged, that the rotors may be mounted beneath the deck 2.

Rotation of the rotors of the vibration generator imparts a vibratory motion to the deck 2 and to the material carried thereon. Such vibratory motion causes the material placed on the deck to be agitated, preventing blocking of the openings 4 in the deck 2, and causes material on the deck 2 to be conveyed towards a downstream end of the screen.

The deck 2 may be formed from a plurality of polyurethane mats arranged in a common plane. Side walls 12,14 are provided on either side of the deck 2 adjacent the side plates 6,8 of the frame. A rear wall 16 extend between the side walls 12,14 at an upstream end of the deck 2. A weir 18 may be provided at the downstream end of the deck 2, over which oversize material (e.g. dewatered sand) is arranged to pass to be received within a collection hopper and/or onto a stockpiling conveyor (not shown).

A sump 19 (FIG. 3) may be provided beneath the deck 2 for collecting water and undersize material that passes through the openings in the deck.

In the embodiment illustrated in the drawings, a pair of dividing walls 20,22 extend from the rear wall 16 of the deck 2, extending parallel to and spaced from the side walls 12,14 of the deck 2, the dividing walls 20,22 dividing or partitioning the surface of the deck 2 into a central material dewatering region D, upon which material to be dewatered is delivered, and a pair of water drainage regions W1,W2 on either side of the material dewatering region D. The dividing walls 20,22 have a length less than that of the side walls 12,14 of the deck 2, such that gaps remain between the ends of the dividing walls 20,22 and the downstream end of the deck 2. The dividing walls 20,22 may have a length between one third and three quarters of the length of the deck 2. The height of the dividing walls 20,22 may be equal to or slightly less than that of the side walls 12,14 of the deck 2.

In one embodiment it is envisaged that the dividing walls may have a maximum height at the rear wall 16 of the deck 2 and a reduced height at the downstream ends of the dividing walls, the height of the walls reducing gradually (such as shown with a broken horizontal line in FIG. 3) or in steps along their length. This may allow water to weir over the dividing walls from the material dewatering region D into the water drainage regions W1,W2.

Figure 3:
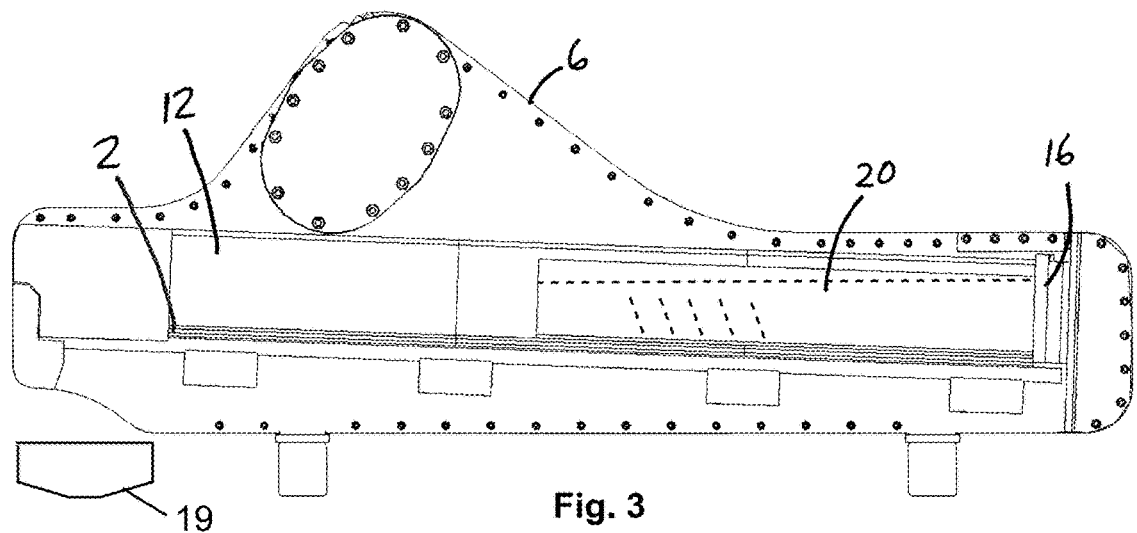
FIG. 3 is a sectional side view of the dewatering screen of FIG. 1 on line A-A of FIG. 4.
Figure 4:
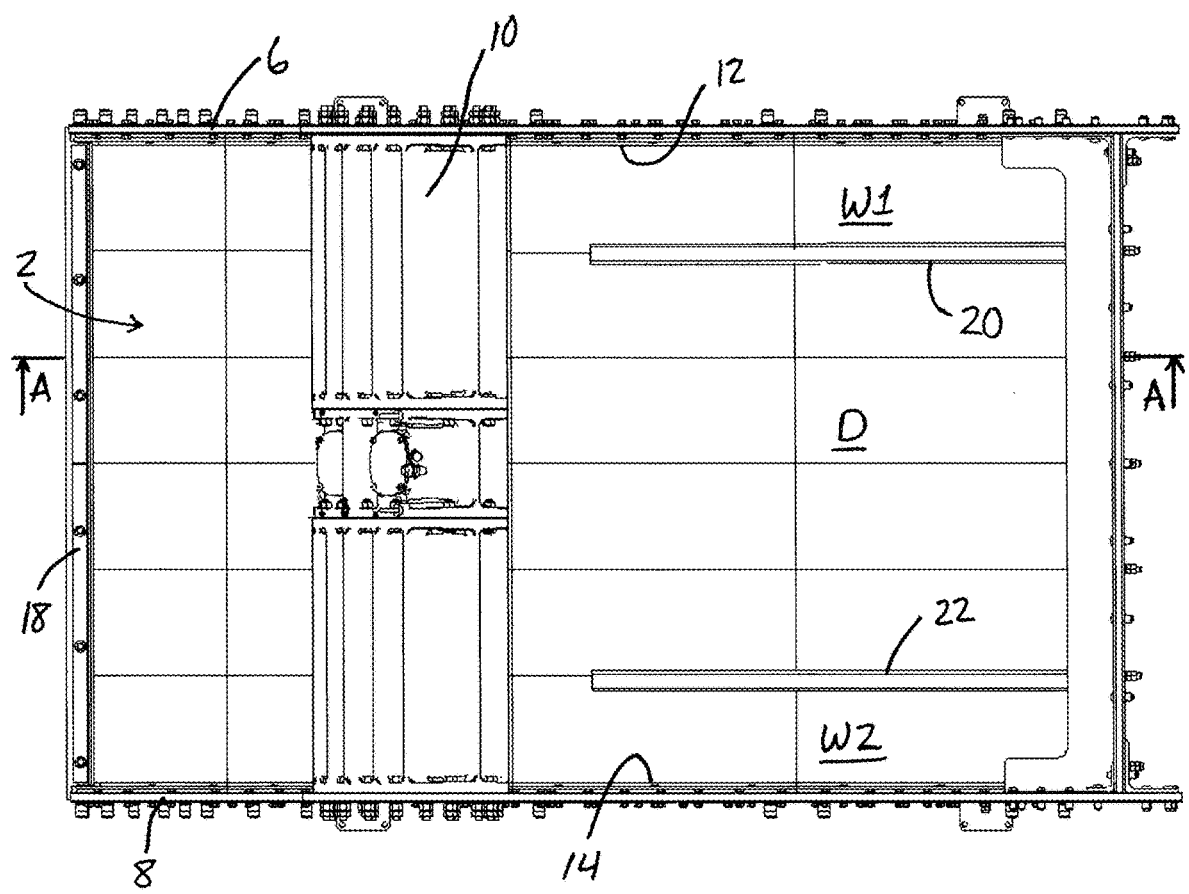
FIG. 4 is a plan view of the dewatering screen of FIG. 1.

At least a portion of each dividing wall may incorporate water drainage apertures, slots or channels, such as indicated with diagonal broken lines in FIG. 3, to allow water to drain through the dividing walls from the material dewatering region D into the water drainage regions W1, W2 and/or directly into the sump beneath the deck. The dividing walls may be at least partially hollow to allow water to draining through the walls, from one side to the other or through the bottom of the walls, via suitable apertures in the portions of the deck to which the dividing walls are attached.

In use, wet particulate material, such as washed sand, to be dewatered is delivered onto the central material dewatering region D of the deck 2 adjacent the upstream end of the deck 2, the material moving towards the downstream end of the deck 2 as the deck is vibrated by the vibration generator. Undersize material and water passes through the openings 4 in the deck 2 while the oversize material, with a reduced water content, passes over the weir 18 at the downstream end of the deck 2. The particulate material tends to form a gradient against the weir 18 at the downstream end of the deck 2.

As the water and particulate material reaches a downstream end of the dividing walls 20,22, the water, with some particulate material, tends to flow around the end of each dividing wall 20,22 and into the water drainage regions W1,W2 on either side of the material dewatering region, and proceeds towards the upstream end of the deck. This water, with a much lower particulate concentration than that on the remainder of the deck 2, can flow more easily through the openings 4 in the water drainage regions W1,W2 of the deck 2. The openings 4 in the water drainage regions W1,W2 of the deck 2 may be greater in area that those in the material dewatering region D of the deck 2, allowing for an even greater flow rate of water through the deck 2 in the water drainage regions W1,W2.

Water may also drain in the water drainage regions W1,W2 and/or directly into the sump through drainage apertures, slots or channels in the dividing walls, where provided, providing an alternative route for the water to reach the sump beneath the deck.

As the flow rate of particulate material and water increases, excess water continues to preferentially flow around the downstream ends of the dividing walls 20,22, and possibly also over the top of the dividing walls 20,22, and into the water drainage regions W1,W2 and readily passes through the deck 2 to drain into the sump therebeneath, while the substantially dewatered particulate material passes over the weir 18 at the downstream end of the deck 2 to be collected in a hopper and/or onto a stockpiling conveyor.

The water and undersize material collected in the sump beneath the deck may be pumped to one or more hydrocyclones, at least a portion of the underflow from the one or more hydrocyclones being passed back onto the deck of the dewatering screen, such as onto the material dewatering region of the deck.

While in the embodiment shown in the drawings the dividing walls are shown as being arranged parallel to the side walls of the deck and one another, it is envisaged that dividing walls may diverge away from each other towards the downstream end of the deck or may converge towards each other.

In an alternative embodiment of the invention it is envisaged that a single dividing wall may be provided, extending from the end wall of the deck to divide the deck into a single material dewatering region and a single water drainage region.

The width of the material dewatering region D may be greater than the width of the water drainage region or the sum of the widths of the water drainage regions W1,W2 where two dividing walls are provided. Optionally, the width of the material dewatering region D is at least twice the width of the water drainage region or the sum of the widths of the water drainage regions.

Reducing the effective size of the material dewatering region of the deck by the provision of one or more dividing walls separating the deck into a material dewatering region and one or more water drainage regions would seem contrary to the accepted principle of increasing the size of the deck available for dewatering material to provide increased capacity. However, by providing separate water drainage regions, with reduced particulate concentration, the problems of the prior art blockage of the openings in the deck and resulting restriction in the flow rate of water through the deck are alleviated and the overall capacity of the dewatering screen is greatly increased. Furthermore, the system is effectively self regulating, with more or less water passing through the water drainage regions of the deck depending upon the flow rate and water content of the material supplied onto the dewatering screen.

In an alternative embodiment is it envisaged that the dewatering screen may be adapted to facilitate the removal of floating material, such as light organics or lignite, from the or each water drainage region via an upstream end of the screen. This could be achieved by partially or fully removing at least a portion of the rear wall 16 of the deck 2 in the water drainage regions W1,W2 or forming suitable apertures or slots in the rear wall in the regions so that water carrying the floating material can flow out of the water drainage regions W1,W2 from an upstream end of the deck. Such water carrying floating material may be passed to further treatment processes, such as a further dewatering screen.

The invention is not limited to the embodiment described herein but can be amended or modified without departing from the scope of the present invention, which is intended to be limited only by the scope of the appended claims as interpreted according to the principles of patent law including the doctrine of equivalents.

The invention claimed is:

1. A dewatering screen comprising:
 a frame;
 a deck mounted upon said frame, said deck having a plurality of apertures therein, an upstream end, and a downstream end;
 a vibration generator for imparting vibration to said deck; and
 at least one dividing wall extending across a portion of said deck, said at least one dividing wall partitioning said deck into a material dewatering region and one or more water drainage regions, and said at least one dividing wall extends from said upstream end toward said downstream end of said deck;
 side walls on either side of said deck;
 a rear wall extending between said side walls at said upstream end of said deck;
 said at least one dividing wall extending from said rear wall of said deck towards said downstream end of said deck;
 wherein said material dewatering region is configured to receive wet particulate material from a delivery device for dewatering the wet particulate material at said deck.

2. The dewatering screen of claim 1, wherein the width of said material dewatering region is greater than or equal to the total width of said one or more water drainage regions.

3. The dewatering screen of claim 1, wherein said at least one dividing wall has a length less than that of said side walls of said deck, such that a gap remains between a downstream end of said at least one dividing wall and said downstream end of the deck.

4. The dewatering screen of claim 1, wherein said at least one dividing wall extends substantially parallel to said side walls.

5. The dewatering screen of claim 1, wherein said at least one dividing wall has a height less than or equal to the height of said side walls.

6. The dewatering screen of claim 1, wherein said at least one dividing wall comprises first and second dividing walls located on either side of said material dewatering region, a respective one of said water drainage regions being provided between each of said first and second dividing walls and a respective side wall of said dewatering screen.

7. The dewatering screen of claim 6, wherein a sum of the widths of said water drainage regions is less than the width of said material dewatering region of said deck.

8. The dewatering screen of claim 7, wherein the width of said material dewatering region is at least twice that of the sum of the widths of said water drainage regions.

9. The dewatering screen of claim 1, wherein said at least one dividing wall has a length of between one third and three quarters of the length of said deck.

10. The dewatering screen of claim 1, wherein said apertures in said one or more water drainage regions are greater in area than said apertures in said material dewatering region of said deck.

11. The dewatering screen of claim 1, further comprising a weir at a downstream end of said deck.

12. The dewatering screen of claim 11, wherein the height of said at least one dividing wall is greater than the height of said weir.

13. The dewatering screen of claim 1, wherein said deck is arranged horizontally, and said vibration generator is adapted to convey particulate material towards a downstream end of said deck.

14. The dewatering screen of claim 1, further comprising a sump beneath said deck for receiving water and undersize material passing through said apertures in said deck.

15. The dewatering screen of claim 1, wherein drainage apertures, slots or channels are provided in at least a portion of said at least one dividing wall to provide an alternative route for water to pass from said material dewatering region into said one or more water drainage regions and/or into a sump located beneath said deck.

16. The dewatering screen of claim 1, wherein the height of said at least one dividing wall varies along its length, the height being greatest at its upstream end and least at its downstream end.

17. A dewatering screen comprising:
 a frame;
 a deck mounted upon said frame, said deck having a plurality of apertures therein;

a vibration generator for imparting vibration to said deck; and at least one dividing wall extending across a portion of said deck, said at least one dividing wall partitioning said deck into a material dewatering region and one or more water drainage regions;

wherein said material dewatering region is configured to receive wet particulate material from a delivery device for dewatering the wet particulate material at said deck; and wherein drainage apertures, slots or channels are provided in at least a portion of said at least one dividing wall to provide an alternative route for water to pass from said material dewatering region into said one or more water drainage regions and/or into a sump located beneath said deck.

18. A dewatering screen comprising:

a frame;

a deck mounted upon said frame, said deck having a plurality of apertures therein;

a vibration generator for imparting vibration to said deck; and at least one dividing wall extending across a portion of said deck, said at least one dividing wall partitioning said deck into a material dewatering region and one or more water drainage regions;

wherein said material dewatering region is configured to receive wet particulate material from a delivery device for dewatering the wet particulate material at said deck; and wherein the height of said at least one dividing wall varies along its length, the height being greatest at its upstream end and least at its downstream end.

* * * * *